US012697269B2

(12) United States Patent
Tichy et al.

(10) Patent No.: US 12,697,269 B2
(45) Date of Patent: Aug. 4, 2026

(54) ORTHOPEDIC STANDING AND WALKING AID

(71) Applicant: SITWORXX O.G., Salzburg (AT)

(72) Inventors: Bernhard Tichy, Salzburg (AT); Peter Lammer, Neumarkt am Wallersee (AT)

(73) Assignee: SITWORXX O.G., Salzburg (AT)

( * ) Notice: Subject to any disclaimer, the term of this patent is extended or adjusted under 35 U.S.C. 154(b) by 471 days.

(21) Appl. No.: 16/492,117

(22) PCT Filed: Mar. 8, 2018

(86) PCT No.: PCT/EP2018/055801
§ 371 (c)(1),
(2) Date: Sep. 7, 2019

(87) PCT Pub. No.: WO2018/162654
PCT Pub. Date: Sep. 13, 2018

(65) Prior Publication Data

US 2021/0128391 A1 May 6, 2021

(30) Foreign Application Priority Data

Mar. 8, 2017 (AT) .............................. A 50181/2017

(51) Int. Cl.
*A61H 3/00* (2006.01)
*A47C 3/22* (2006.01)

(52) U.S. Cl.
CPC ............... *A61H 3/008* (2013.01); *A47C 3/22* (2013.01); *A61H 2201/1253* (2013.01);
(Continued)

(58) Field of Classification Search
CPC .... A47C 3/20; A47C 3/22; A47C 9/02; A47C 9/022; A47C 9/025; A47C 15/004;
(Continued)

(56) References Cited

U.S. PATENT DOCUMENTS 2,589,803 A 3/1952 Haley
3,914,808 A * 10/1975 Woods ................ A61G 7/1046
5/83.1
(Continued)

FOREIGN PATENT DOCUMENTS

CN 101632614 A 1/2010
DE 1061983 B 7/1959
(Continued)

*Primary Examiner* — Matthew D Ziegler

(57) ABSTRACT

An orthopedic standing and walking aid includes a carriage which is displaceably mounted on a running rail, an approximately C-shaped frame suspended from the carriage by a suspension device and a saddle which is arranged on the C-shaped frame approximately in linear alignment below the suspension device. The orthopedic standing and walking aid can be distinguished by a spring element arranged in the area between the carriage and the saddle so that the saddle is elastically supported in the vertical direction. The orthopedic standing and walking aid may also be distinguished by a height adjustment mechanism for adjusting the height of the saddle, which has a height adjustment spring element which exerts an upward preload on the saddle. This height adjustment mechanism can be designed to be lockable with one hand by means of a locking unit.

14 Claims, 3 Drawing Sheets

(52) U.S. Cl.
CPC ................ *A61H 2201/1607* (2013.01); *A61H 2201/1626* (2013.01); *A61H 2201/1633* (2013.01); *A61H 2201/1642* (2013.01)

(58) Field of Classification Search
CPC .... A61G 7/1042; A61G 7/1059; A61H 3/008; A61H 3/04; A61H 2003/007; A61H 2201/0192; A61H 2201/1253; A61H 2201/1604; A61H 2201/1607; A61H 2201/1623; A61H 2201/1626; A61H 2201/1633; A61H 2201/164; A61H 2201/1642; A61H 2201/165
USPC ........................................................ 482/66, 69
See application file for complete search history.

(56) References Cited

U.S. PATENT DOCUMENTS

| | | | | |
|---|---|---|---|---|
| 4,099,697 | A * | 7/1978 | Von Schuckmann .... | A47C 3/30 248/398 |
| 4,463,817 | A * | 8/1984 | Mennesson .............. | A61H 3/04 482/68 |
| 4,807,870 | A * | 2/1989 | Hickman ................. | A61H 3/04 482/142 |
| 4,861,051 | A * | 8/1989 | Napper .................... | A61H 3/04 482/68 |
| 5,038,425 | A | 8/1991 | Merry | |
| 5,379,701 | A | 1/1995 | Sumi et al. | |
| 5,456,655 | A * | 10/1995 | Morris ................... | A61B 6/107 2/9 |
| 5,458,550 | A * | 10/1995 | Braim .................... | A61H 3/008 297/274 |
| 5,623,948 | A | 4/1997 | Van Morris | |
| 5,732,964 | A * | 3/1998 | Durham ................. | A47C 9/002 297/259.4 |
| 6,648,417 | B1 * | 11/2003 | Gilbert ................... | A47C 7/506 297/423.19 |
| 6,793,609 | B1 * | 9/2004 | Fan .................. | A63B 21/00196 482/57 |
| 7,093,900 | B1 * | 8/2006 | Schon .................... | A47C 9/002 297/259.4 |
| 7,594,696 | B2 * | 9/2009 | Girard ........................ | B62J 1/08 297/130 |
| 7,708,251 | B2 * | 5/2010 | Watt ....................... | B62K 19/36 248/407 |
| 7,900,940 | B1 * | 3/2011 | Vidmar .................... | A61H 3/04 280/87.021 |
| 7,930,775 | B2 * | 4/2011 | Kluckhuhn .......... | A61G 7/1042 5/81.1 R |
| 8,151,812 | B2 * | 4/2012 | Razon ...................... | A61H 3/04 297/195.1 |
| 8,584,273 | B1 * | 11/2013 | Simoes ................ | A61G 7/1059 5/81.1 RP |
| 8,763,176 | B2 * | 7/2014 | Lim ..................... | A61G 7/1057 5/607 |
| 9,808,388 | B2 * | 11/2017 | Powell, Sr. .......... | A61G 7/1011 |
| 2002/0077221 | A1 * | 6/2002 | Dalebout ........... | A63B 22/0605 482/57 |
| 2003/0084508 | A1 * | 5/2003 | Faucher ............. | A63B 21/4011 482/7 |
| 2006/0189453 | A1 * | 8/2006 | Leblond ............. | A63B 71/0009 482/69 |
| 2007/0057482 | A1 * | 3/2007 | Hsu ...................... | B62K 15/008 280/278 |
| 2007/0067905 | A1 * | 3/2007 | Wilder ................. | A61G 7/1048 5/83.1 |
| 2010/0000002 | A1 * | 1/2010 | Rees ...................... | A61B 6/107 2/9 |
| 2012/0000496 | A1 * | 1/2012 | Razon ...................... | A61H 3/04 135/67 |
| 2012/0042917 | A1 * | 2/2012 | Workman ................ | A61H 3/04 135/66 |
| 2012/0319444 | A1 * | 12/2012 | Onopa ................... | A47C 9/005 297/338 |
| 2014/0077548 | A1 * | 3/2014 | Peterson .................. | A47C 7/02 297/284.4 |
| 2014/0094345 | A1 * | 4/2014 | Kim ................... | A63B 21/4011 482/7 |
| 2014/0311828 | A1 * | 10/2014 | Bassett ..................... | E06C 7/00 182/124 |
| 2016/0374472 | A1 * | 12/2016 | Horn ........................ | A47C 9/06 297/344.21 |
| 2017/0056277 | A1 * | 3/2017 | McNicholl ............... | A61H 3/04 |
| 2019/0002048 | A1 * | 1/2019 | Winefordner ........... | F16B 7/105 |

FOREIGN PATENT DOCUMENTS

| | | | | |
|---|---|---|---|---|
| DE | 69301509 | T2 | 7/1996 | |
| DE | 102009021316 | A1 | 11/2010 | |
| DE | 102011050753 | A1 | 12/2012 | |
| DE | 102014002189 | A1 * | 8/2015 | ................ B62J 1/08 |
| EP | 0582255 | A1 | 2/1994 | |
| FR | 2217262 | A1 | 9/1974 | |
| FR | 2225376 | A2 * | 11/1974 | ............ A47C 9/022 |
| JP | H09168568 | A | 6/1997 | |
| JP | 2004075383 | A | 3/2004 | |
| JP | 2007020602 | A | 2/2007 | |
| JP | 2008055140 | A | 3/2008 | |
| JP | 2011078478 | A | 4/2011 | |
| JP | 2012011161 | A | 1/2012 | |
| JP | 2012035014 | A | 2/2012 | |

* cited by examiner

ORTHOPEDIC STANDING AND WALKING AID

FIELD OF THE INVENTION

This invention concerns an orthopedic standing and walking aid.

BACKGROUND OF THE INVENTION

Document U.S. Pat. No. 2,589,803 discloses a work seat that can be moved along a rail. This work seat can be used, for example, by a dentist to move along a patient chair. Further work seats movable along a rail are described, for example, in EP 0 582 255 B1 or DE 693 01 509 T2, DE 10 2009 021 316 A1, DE 10 2011 050 753 A1 and DE 1 061 983 A.

Further seats suspended from the ceiling to assist a worker in his work are described in JP 2007-020602 A and JP 2011-078478 A.

Document FR 2225376 A2 discloses a standing and walking aid that has a seat that is coupled to a vertical, straight bar. A spring element is integrated in the straight bar. The straight bar is bent at the upper end in such a way that this unit can be suspended from a carriage movable along a rail in such a way that a user seated on the saddle or seat is positioned approximately in vertical alignment below the carriage.

Another standing and walking aid is shown in FR 2217262 A1.

Document DE 1061983 B discloses a work seat that is freely suspended from a trolley that can be moved on a rail.

The present invention is intended to create an orthopedic standing and walking aid which is simply designed, yet allows its user as much freedom of movement a possible, reliably supports him and is nevertheless easy to use.

The object is solved by an orthopedic standing and walking aid described herein.

SUMMARY OF THE INVENTION

An orthopedic standing and walking aid according to a first aspect of the present invention includes

- a carriage which is displaceably mounted on a running rail in the longitudinal direction of the running rail,
- an approximately C-shaped frame suspended on the carriage by means of a suspension device,
- a saddle which is arranged on the C-shaped frame approximately in rectilinear alignment below the suspension device, the saddle having an elongate slim shape in such a way that a person sitting on the saddle can arrange his/her legs laterally downward past the saddle, and
- a spring element which is arranged in the region between the carriage and the saddle so that the saddle is elastically supported in the vertical direction.

By providing the C-shaped frame, a person sitting on the saddle can be in a rectilinear alignment underneath the carriage, so that a large part of the body weight is transferred from the orthopedic standing and walking aid upwards to the running rail, with no transverse forces occurring, as the person with his/her center of gravity can be in the area underneath the carriage. The person can therefore sit safely and relaxed on the saddle.

The orthopedic standing and walking aid according to the first aspect of the present invention is distinguished by the fact that the running rail is mounted on another rail arrangement so that it can be displaced transversely to its longitudinal direction. This allows the carriage and thus the saddle to be moved in a horizontal plane below the running rail and the further rail arrangement. This gives a person sitting on the saddle the freedom to move along a floor in any direction.

Since the saddle is designed and shaped in such a way that the person's legs can be positioned laterally past the saddle and directed downwards, the person can find support on a floor underneath and transfer a part of his/her body weight to the floor. Only a fraction of the person's body weight therefore rests upon the person's legs, and this fraction can be freely adjusted by the person, depending on how strongly the person rests on the floor.

Because the person can support himself/herself on the floor, he/she can also generate lateral forces with respect to the floor which cause the C-shaped frame and carriage to move along the running rail. This makes it easy for the person to move along the running rail, with the majority of the body weight being carried by the orthopedic standing and walking aid.

Such movements require a certain amount of floor support. These movements often cause the buttocks of the person sitting on the orthopedic standing and walking aid to be raised and lowered. The provision of the spring element ensures that the contact with the saddle is not lost when the buttocks are slightly raised, as the spring element automatically moves the saddle a little upwards towards the buttocks. A person on the orthopedic standing and walking aid can therefore move with the orthopedic standing and walking aid without losing contact with the saddle or the orthopedic standing and walking aid. Therefore, it is not necessary for the person to be connected to the orthopedic standing and walking aid. The orthopedic standing and walking aid according to the invention does not require a fastening belt to secure the person on it. The person simply has to sit on the saddle like in a conventional chair and can then move freely within a predetermined range of movement.

Therapy facilities are known with which the weight acting on the legs is to be reduced. These therapy devices are strapped to the body of the respective person with one or more straps. The dressing and undressing of such a therapy device can take up to 10 minutes each. In the case of a 30-minute therapy unit, the dressing and undressing of the therapy device can thus consume a large part of the available time. The orthopedic standing and walking aid according to the invention can be used for therapeutic purposes. The person to be treated only has to take a seat on the saddle and can immediately begin with appropriate exercises. This significantly increases the efficiency of the corresponding therapy units.

The orthopedic standing and walking aid can also be used for other purposes. Workers who spend most of their working time in a local area, such as cooks who mainly work in the kitchen, can use such an orthopedic standing and walking aid, allowing them to move freely between the individual workplaces. This is particularly useful if the worker can no longer put the entire body weight on one or both legs for an extended period of time due to injury or illness. Other occupational groups for which the standing and walking aid is suitable are, for example, hairdressers, beauticians or surgeons.

The C-shaped frame can be so elastic that it forms the spring element. Such elastic formation of the C-shaped frame is present if the C-shaped frame yields vertically downwards by at least 3 mm under a load of 80 kg.

Preferably, the C-shaped frame is so elastic that it yields vertically downwards by at least 5 mm at a load of 50 kg.

An elastic C-shaped frame, for example, can be made of a fiber-reinforced plastic material.

An orthopedic standing and walking aid according to a second aspect of the present invention is distinguished in that the spring element is arranged between the suspension device and the C-shaped frame or between the saddle and the C-shaped frame.

This makes it possible to shape the C-shaped frame with any bend and form it to be closely fitting in relation to the body of a person sitting on the saddle. This allows the C-shaped bow to be designed ergonomically and in space-saving manner. Furthermore, the spring element is in rectilinear vertical alignment with the suspension device. The spring element only has to absorb forces in the vertical direction. It is not necessary for the spring element to be stiffened in the longitudinal direction in order to be able to transmit laterally acting moments, as is necessary, for example, with the device known from FR 2225376 A2.

The spring element is preferably a coil spring. The coil spring can be loaded with tension or compression.

The spring element preferably has a spring constant of at most $10^5$ N/m, in particular of at most $5\times10^4$ N/m and preferably of at most $3\times10^4$ N/m.

According to another aspect of the present invention, an orthopedic standing and walking aid according to the invention comprises

- a carriage which is displaceably mounted on a running rail in the longitudinal direction of the running rail,
- an approximately C-shaped frame suspended on the carriage by means of a suspension device,
- a saddle which is arranged on the C-shaped frame approximately in rectilinear alignment below the suspension device, the saddle having an elongate slim shape in such a way that a person sitting on the saddle can arrange his/her legs directed downwards laterally past the saddle, and —
- a height adjustment mechanism for adjusting the height of the saddle, said height adjustment mechanism comprising a height-adjusting spring member which exerts an upward preload on the saddle and a locking unit with which the height-adjusting spring element is lockable.

This height adjustment mechanism can be operated solely by releasing and re-locking, since the preload exerted by the height-adjusting spring element presses the saddle against the buttocks of the person sitting on it. In the unlocked state, the person can adjust the height of the saddle solely by raising or lowering the buttocks. If the locking device can be released with one hand and adjusted again with one hand, the height adjustment mechanism can be operated with one hand.

A person sitting on the height adjustment mechanism can quickly and easily adjust the height of the saddle so that he or she can reach different heights during his or her work while sitting on the saddle. For example, a cook sitting on the orthopedic standing and walking aid in a kitchen can quickly and easily reach drawers at different heights of the kitchen furniture using the height adjustment mechanism.

Preferably the locking unit has an operating lever. In particular, this operating lever can be operated with one hand so that the other hand is free when the height adjustment mechanism is actuated.

The height adjustment mechanism is preferably located in the area immediately below the saddle, so that it is easily and quickly accessible for the person sitting on the saddle.

The height adjustment spring element can have a gas or oil pressure spring.

In the various orthopedic standing and walking aids described above, a rail arrangement can be provided on which the running rail is displaceably mounted transversely to a longitudinal direction. This means that the carriage mounted on the running rail can be moved in a plane.

The suspension device may include a swivel joint so that the C-shaped frame is rotatably suspended. The swivel joint, for example, is equipped with a ball bearing. A person sitting on the orthopedic standing and walking aid can then rotate around the vertical axis as desired.

One or more fastening means may be provided on the C-shaped frame for attaching additional elements such as a hand bow, a backrest, a headrest, a leg support, a footrest and/or a holding device to the C-shaped frame.

According to another aspect of the present invention, a method for supporting a person is provided using an orthopedic standing and walking aid as described above. This method is distinguished in that the orthopedic standing and walking aid is arranged such or the height of the saddle is adjusted in such a way that a person sitting thereon can touch a floor located under the orthopedic standing and walking aid with his/her feet so that a part of the body weight of this person is carried by the orthopedic standing and walking aid and the other part of the body weight is transferred to the floor.

A part of the body weight is taken up by the orthopedic standing and walking aid and yet the person can move freely within the movement range of the orthopedic standing and walking aid. It is not necessary for the person to be attached to the orthopedic standing and walking aid by means of a strap or the like.

Preferably, the leg muscles, which are relieved by the orthopedic standing and walking aid, are stimulated by electrical signals. A corresponding electronic control device can be integrated into the orthopedic standing and walking aid. This prevents the corresponding leg muscles from receding due to the low load on the leg muscles.

The saddle may be mounted on a pivot joint so that it can swivel sideways and/or forwards and backwards. Such a pivot joint is, for example, a ball joint or an elastomer joint. Sitting on a seat surface supported in this way strengthens the back and abdominal muscles and requires a straight, healthy, upright sitting position.

According to a further aspect of the present invention, a vertical access aid is provided, which includes

- a roughly C-shaped frame suspended from a suspension device,
- a saddle which is arranged on the C-shaped frame approximately in rectilinear alignment below the suspension device, and
- a guiding device for guiding the vertical access aid along a vertical wall.

The guiding device, for example, can be formed by two or more rollers, which are attached to the C-shaped frame by means of a corresponding mounting.

Such a vertical access aid can be lifted by a crane and moved along a vertical wall so that a person sitting on the saddle can do predetermined work on the vertical wall. This work can be painting or cleaning, for example. The guiding device may be located below and/or above the person sitting on the saddle.

Preferably, the vertical access aid has fastening means for securing a securing element, such as a safety belt. Such fastening means may include, for example, an eye.

The saddle preferably has an elongate slim shape.

This vertical access aid can be supplemented by other components of the orthopedic standing and walking aid described above, such as different mountings arranged on the C-shaped frame, a spring element, foot supports, handles, hand bows, headrests, leg supports, footrest, pivot bearings and/or spring element. The provision of a spring element is particularly useful when the vertical access aid is used in places where the user can support himself/herself with his/her feet against a support, beams or steps, for example.

BRIEF DESCRIPTION OF THE DRAWINGS

The invention is explained by way of example in more detail below using the drawings in which.

DETAILED DESCRIPTION OF THE PREFERRED EMBODIMENTS

Figure 1:
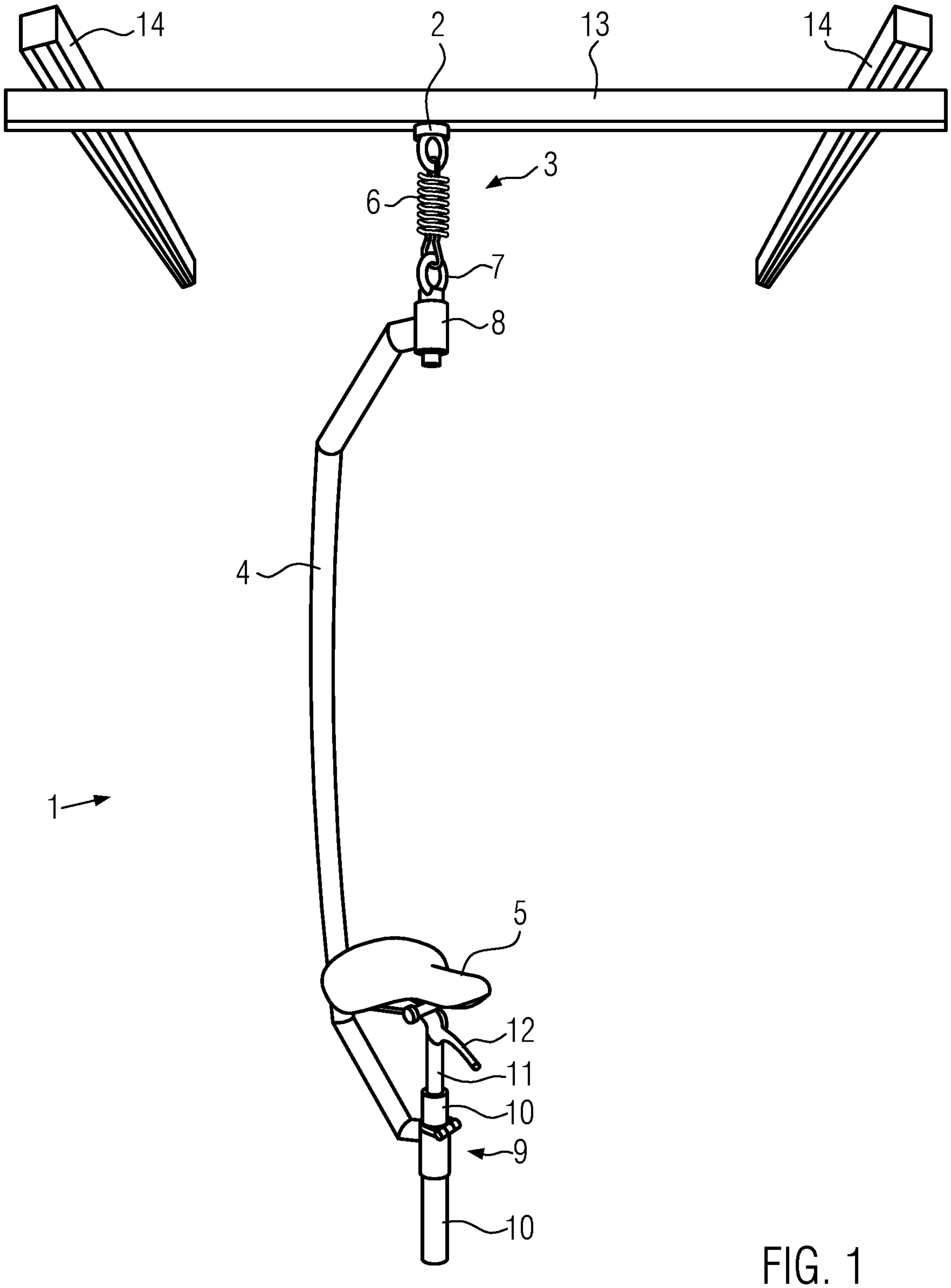
FIG. 1 shows a first exemplary embodiment of an orthopedic standing and walking aid according to the invention in a perspective view.

An orthopedic standing and walking aid 1 according to a first exemplary embodiment includes a carriage 2 which is displaceably mounted, a suspension device 3 and an approximately C-shaped frame 4, which is attached to the carriage 2 by means of the suspension device. The C-shaped frame 4 is connected at one end to the carriage 2 by means of the suspension device 3. At the other end of the C-shaped frame 4, a saddle 5 is arranged whose seat surface faces upwards.

The C-shaped frame 4 is dimensioned such that the upper body of an adult person sitting on the saddle 5 is surrounded by the C-shaped frame 4. Preferably the C-shaped frame 4 is so large that the person's body does not touch it when the person is on the saddle 5. However, the C-shaped frame 4 can also be close to the person's body, so that the C-shaped frame does not take up much space and does not disturb other people.

The saddle 5 is approximately in a rectilinear, vertical alignment under the suspension device 3 or under the carriage 2.

The suspension device 3 has a spring element 6, which gives the orthopedic standing and walking aid 1 elasticity in the vertical direction. Preferably the spring range and/or the spring stiffness of the spring element 6 is adjustable.

The suspension device 3 has a detachable connecting element 7 so that the C-shaped frame 4 can be detached from the carriage 2. The detachable connecting element 7 is, for example, an eye and a karabiner. The detachable connecting element 7 can be arranged in the area between the spring element 6 and the C-shaped frame 4 or in the area between the spring element 6 and the carriage 2.

Furthermore, the suspension device 3 is equipped with a pivot bearing 8 so that the C-shaped frame 4 can rotate freely in relation to a vertical axis. In the present exemplary embodiment, the pivot bearing 8 is designed as a ball bearing.

The saddle 5 is attached to the lower end of the C-shaped frame 4 with a height adjustment mechanism 9. The height adjustment mechanism 9 has a sleeve 10 connected to the C-shaped frame 4. A saddle post 11 is slidably mounted in the sleeve 10. The saddle 5 is attached to the upper end of the saddle post 11. The saddle post 5 is equipped with an operating lever 12, which can be swiveled back and forth between two positions, whereby in one position the saddle post 11 is fixed in the sleeve 10. In the other position, the saddle post 11 is freely movable in the sleeve 10. Below the saddle post 11, a gas pressure spring (not shown) is arranged, which applies a preload upwards to the saddle post 11. In the released position, the saddle post 11 is pushed upwards by means of the gas pressure spring. Such a height adjustment mechanism is known, for example, from DE 10 2014 002 189 A1.

The carriage 2 is mounted on a running rail 13 so that it can move in the longitudinal direction of the running rail 13. The running rail 13 is itself mounted on a further rail arrangement 14, which comprises two parallel rails, so that it can be displaced transversely to its longitudinal direction. This allows the carriage 2 to move freely in a plane which is defined by the rail arrangement 14.

The use of this orthopedic standing and walking aid is explained in more detail below:

A person sits down on the saddle 5 with his/her buttocks. This ensures that at least part of the body weight is transferred to the carriage 2 via the C-shaped frame 4 and the suspension device 3. Due to the load exerted by this person, the spring element 6 is deflected downwards a little.

The saddle 5 has an elongate slim shape, similar to a bicycle saddle, so that a person sitting on the saddle can arrange his/her legs directed downwards laterally past the saddle. This allows the person sitting on the saddle 5 to support himself or herself with his or her feet on a floor below the orthopedic standing and walking aid 1. The proportion of weight that is transferred to the carriage 2 via the orthopedic standing and walking aid 1 depends on the extent to which the person rests on the ground and is freely selectable by said person. As the person can rest on the ground, the orthopedic standing and walking aid 1 can move freely in the area of the rail arrangement 14 and rotate around the vertical axis as desired.

When the person moves within the available movement range, it cannot be avoided that the buttocks of the person sitting on the saddle are raised and lowered a little. By providing the spring element 6, the saddle 5 is elastically pressed upwards against the buttocks so that the saddle and thus the orthopedic standing and walking aid 1 also follows a vertical movement of the person in a certain area. This ensures that contact with the saddle 5 is not lost and the person sitting on the saddle 5 can move freely, with the support by the orthopedic standing and walking aid 1 being ensured even if slight vertical movements occur during the movement of the person. Therefore, it is not necessary for the orthopedic standing and walking aid 1 to be provided with means with which the person sitting on it is attached to it.

Such means are only necessary if the orthopedic standing and walking aid 1 is used for persons who do not have the necessary sense of balance to be able to stand freely or to maintain the posture on a saddle. All persons who have a minimal sense of balance can sit on the orthopedic standing and walking aid 1 according to the invention without having to be attached to it.

The height adjustment mechanism 9 can be operated with one hand by the operating lever 12, which is located directly below the saddle 5. This allows the person sitting on the saddle 5 to adjust the height of the saddle 5 quickly and easily and thus reach different heights. Since the height adjustment mechanism 9 can be operated with one hand, the other hand is available to the person for other activities. The height adjustment range of the height adjustment mechanism 9 can be adapted to the individual movement requirements of the person. If the person is a warehouse worker who has to place goods on a storage shelf and remove them from it, a very large height adjustment range can be useful. If, however, the orthopedic standing and walking aid 1 is used for therapeutic purposes, the height adjustment range must be selected such that the saddle can be adjusted to typical body heights.

Figure 2:
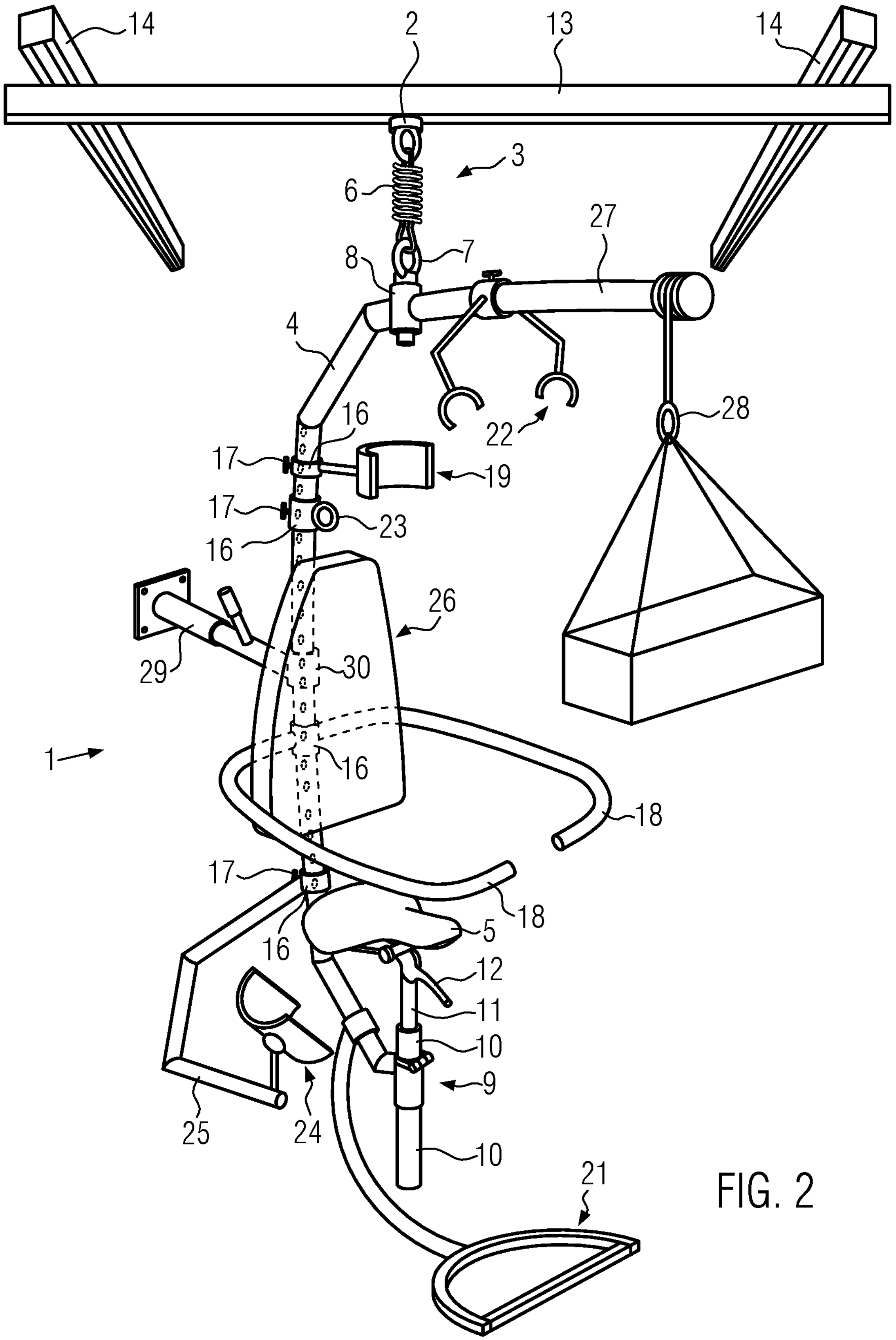
FIG. 2 shows a second exemplary embodiment of the standing and walking aid according to the invention with additional elements compared to the first exemplary embodiment, and FIG. 3 show an exemplary embodiment of a vertical access aid in a perspective view.

FIG. 2 shows a second exemplary embodiment of the orthopedic standing and walking aid 1. Same elements are marked with the same reference signs. In order to avoid repetitions, reference is made to the description of the first exemplary embodiment, which also applies to these elements, unless otherwise stated below.

The C-shaped frame 4 is provided with fastening means 15 to which additional elements can be attached. In this exemplary embodiment, the fastening means are through-holes so that collars 16, which also have corresponding through-holes, can be fixed to the frame 4 with a bolt. The bolt is preferably spring-loaded and equipped with a handle 17 so that it can be pulled at the handle 17 a little out of the collar 16 against the spring action, whereby the connection between the collar 16 and the frame 4 is released. The collar 16 can then be moved to any other position in which the corresponding through-holes are provided to accommodate the bolt.

With these collars, different elements can be fastened to the frame 4. These elements are preferably fastened to the collars 16 with a non-positive connection, such as a soldered or welded joint. These elements may be a hand bow 18, a headrest 19, a leg support 20, a footrest 21, a holding device 22 and/or an eye 23. A person, for example, can be fixed to the eye by means of a belt or a strap arrangement similar to a climbing harness.

The leg support has a somewhat bowl-shaped receptacle 24 to support the thigh or lower leg of a person using the orthopedic standing and walking aid 1, and a rigid linkage 25. The rigid linkage 25 preferably has joints, which are fixable, so that the position of the bowl-shaped receptacle 24 can be freely fixed in a certain area to support a thigh or lower leg.

The footrest 21 is similar to a stirrup and is attached to one of the collars 16 with an elastic band.

A backrest 26 may also be provided. In the present exemplary embodiment, the backrest 26 is attached to the same collar 16 as the hand bow 18. It is of course possible to arrange a backrest on a collar that is independent of the hand bow 18.

The C-shaped frame 4 can in principle be extended a little beyond the connection point of the saddle 5 or beyond the connection point of the suspension device 3. In the exemplary embodiment shown in FIG. 2, the C-shaped frame 4 is extended with a section 27 beyond the connection point on the suspension device 3. This section 27 is provided with a holding device 22 to which a screen, tablet or other parts can be attached.

A cable winch 28 is provided at the free end of the section 27 with which loads can be lifted. This allows a person to easily move larger loads without damaging their own body. When such a load-bearing device is provided, it is advisable if the saddle 5 can be moved horizontally in the longitudinal direction of the saddle. This allows the position of the saddle to be pushed back a little when a load is picked up, balancing the load and the weight of the person around the connection point on the suspension device 3. This shifting device is preferably lockable by means of a lever similar to the height adjustment direction.

Furthermore, a fixing arm 29 can be provided with which the C-shaped frame is fixed. The fixing frame 29 can either be attached to a building wall or to a frame. The fixing arm 29 has a clamping collar 30 with which the fixing arm can detachably hold the frame 4. This fixing frame 29 is used to temporarily fix the C-shaped frame or the orthopedic standing and walking aid 1 so that a person whose sense of balance is greatly impaired can take a seat on the saddle 5 more easily. When this person is sitting on the saddle, the clamping collar 30 is released and he or she can then move with the support of the orthopedic standing and walking aid. In such a situation, the hand bow 18 is also preferably provided. The person can then hold on to the hand bow, which makes it easier to maintain balance on the orthopedic standing and walking aid.

The second exemplary embodiment shows that the orthopedic standing and walking aid 1 can be used in different variations. However, it is assumed that the design according to the first exemplary embodiment is most widely used in practice, since the design according to the first exemplary embodiment gives the user the most freedom.

In the exemplary embodiments explained above, the rail arrangement is designed to be attached to a building ceiling so that the user of the standing and walking aid can move freely in the area of rail arrangement 14 with reduced load on his/her legs.

Within the scope of the invention, the rail arrangement can be mounted on a framework so that it can be erected without a building. The framework can also be designed so as to be movable, so that the location of the rail arrangement can be easily changed. The means for moving the framework are preferably lockable, so that the position of the rail arrangement can be clearly determined.

Figure 3:
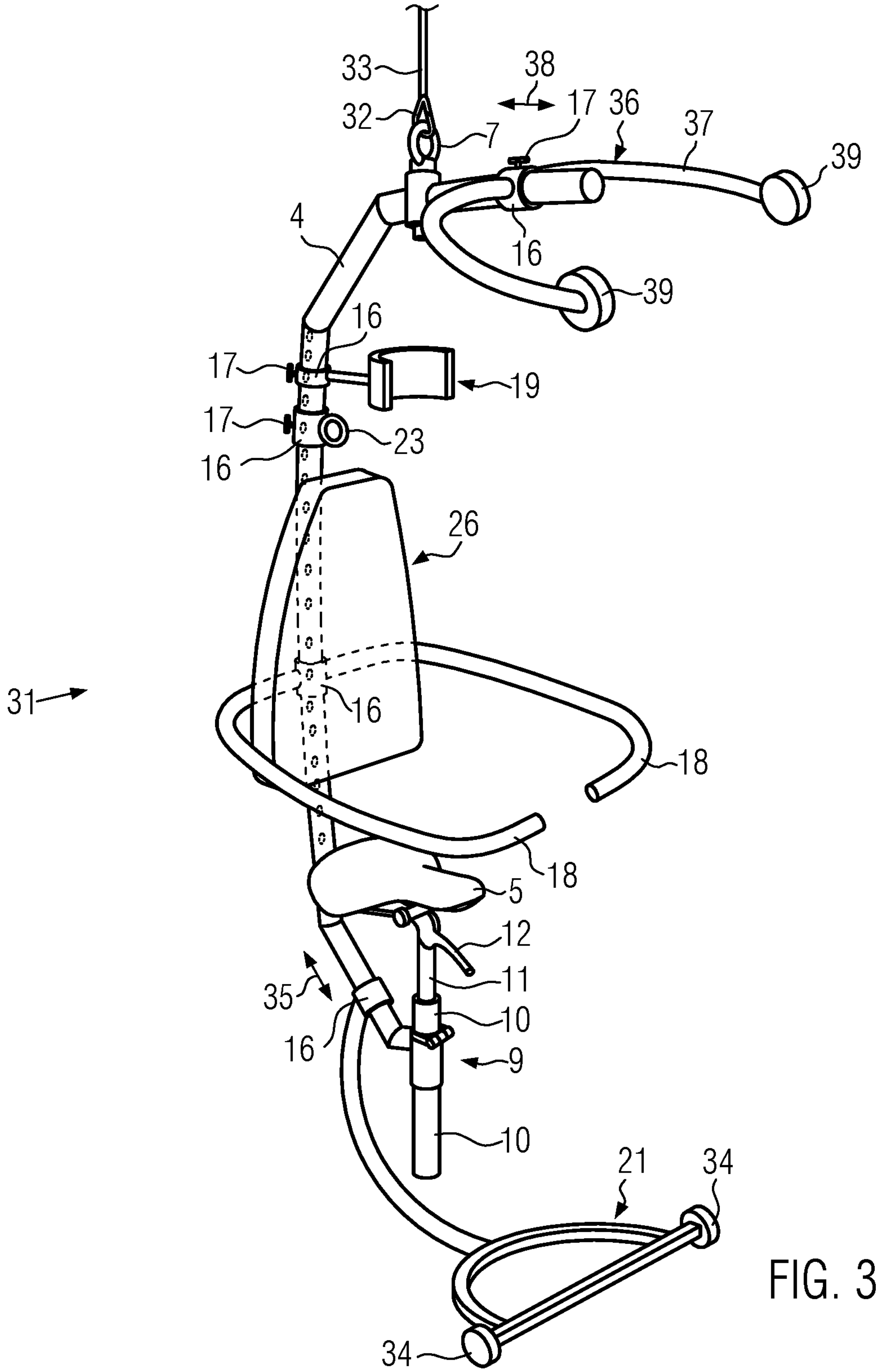

The standing and walking aid described above can also be modified in such a way that it can be used as a vertical access aid 31 (FIG. 3). In the following, such an exemplary embodiment of a vertical access aid 31 is explained, wherein the same parts as with the standing and walking aid are marked with the same reference signs and are not explained again.

This vertical access aid 31 again has a C-shaped frame 4, a saddle 5 and a detachable connecting element 7, which acts as a suspension device. In this exemplary embodiment, the detachable connecting element is an eye in combination with a karabiner 32 to attach the vertical access aid 31 to a rope 33. The rope 33 can be lifted and lowered by means of a crane (not shown).

On a footrest 21, which is connected to the C-shaped frame 4 by means of a collar 16, rollers 34 are arranged laterally, which are mounted so as to be rotatable about a common horizontal axis. The rollers 34 preferably have a soft elastic surface. The rollers 34, for example, are made of rubber. This allows the rollers 34 to roll along a vertical wall without leaving marks on the wall.

The collar 16 can be adjusted by a short distance along the C-shaped frame 4 (double arrow 35). The C-shaped frame 4 is arranged at an oblique angle relative to the saddle post 11 of the saddle 5 in that section where the collar 16 is arranged. This allows the adjustment of the distance between the footrest 21 and the saddle 5 in the vertical direction as well as the adjustment of the distance between the footrest 21 and the saddle post 11 in the horizontal direction. Thus the distance between the saddle 5 and a wall can also be adjusted by adjusting the footrest 21 with respect to the C-shaped frame 4.

The footrest 21 together with the rollers 34 forms a guiding device for guiding the vertical access aid 31 along a vertical wall.

Alternatively or in addition to this guiding device, a further guiding device 36 can be arranged at the upper end of the C-shaped frame and has an approximately U-shaped bow 37 in plan view. The U-shaped bow 37 is equipped with a collar 16 at its bottom section of the U-shape, with which the guiding device 36 can be slidably attached to the upper end section of the C-shaped frame 4. The collar 16 and thus the guiding device 36 can be moved along a straight, approximately horizontal section of the C-shaped frame 4 (double arrow 38). A roller 39 is arranged at each free end of the bow 37. The rollers 39 are mounted so that they can rotate about a common, approximately horizontal axis so that they can roll along a vertical wall. The rollers 39 are preferably soft elastic rollers, especially rubber rollers, just like the rollers 34.

An eye 23 is attached to the C-shaped frame 4. This eye 23 is used to fasten a safety harness, especially a climbing harness.

The vertical access aid 31 can be raised and lowered vertically along a wall with a suitable crane. A person sitting on the saddle 5 can lift the vertical access aid 31 a little from the vertical wall by supporting himself/herself with his/her feet against the wall, so that the vertical access aid 31 can be moved slightly sideways. This allows the vertical access aid 31 to be raised or lowered along different paths along a vertical wall.

Both the vertical access aid 31 and the orthopedic standing and walking aids 1 described above can be attached to a crane with a swiveling arm, so that they can be moved a little in the horizontal direction by swiveling the swivel arm.

A vertical/alpine rope technology can also be used instead of a crane. An anchorage means known per se, such as an eye can be provided on the upper edge of the vertical wall, to which a rope is attached. The vertical access aid can be lowered gradually on this rope.

The invention claimed is:

1. An orthopedic standing and walking aid, comprising:

a carriage which is displaceably mounted on a running rail in a longitudinal direction of the running rail, wherein the running rail is mounted on a further rail arrangement so as to be displaceable transverse to the longitudinal direction of the running rail, and wherein the carriage moves in a horizontal plane below the running rail and the further rail arrangement, an approximately C-shaped frame suspended on the carriage by a suspension device including a spring so that the C-shaped frame is elastically supported by the running rail in a vertical direction, a saddle which is arranged on the C-shaped frame approximately in rectilinear alignment below the suspension device, with a saddle post extending from the saddle into a sleeve connected to the C-shaped frame, wherein the saddle post is slidably mounted in the sleeve, a height-adjusting spring arranged below the saddle post, which exerts an upward preload on the saddle and allows for adjusting a height of the saddle, and a lock with which the height-adjusting spring is lockable, wherein the saddle has an elongate slim shape whereby a person sitting on the saddle arranges his/her legs directed downwards on opposite lateral sides of the saddle to be in a standing position while seated, wherein the C-shaped frame does not include a backrest or an abdominal support, and the C-shaped frame is shaped so that a person's body does not touch the C-shaped frame when the person is sitting on the saddle, and wherein a body weight of the person sitting on the saddle is transferred from the orthopedic standing and walking aid upwards to the running rail and no part of the orthopedic standing and walking aid touches a floor located under the orthopedic standing and walking aid, and wherein the person sitting on the saddle is able to walk around freely in all directions while seated.

2. The orthopedic standing and walking aid according to claim 1, wherein the C-shaped frame is of elastic construction whereby the C-shaped frame and the spring are formed as a single component.

3. The orthopedic standing and walking aid according to claim 1, wherein the lock has an operating lever that is operated with one hand.

4. The orthopedic standing and walking aid according to claim 1, wherein the height-adjusting spring is arranged in a region directly below the saddle.

5. The orthopedic standing and walking aid according to claim 1, wherein the height-adjusting spring is a gas pressure spring.

6. The orthopedic standing and walking aid according to claim 1, wherein the suspension device comprises a swivel joint so that the frame is rotatably suspended.

7. The orthopedic standing and walking aid according to claim 1, wherein the saddle is arranged on a pivot joint attached to the C-shaped frame.

8. The orthopedic standing and walking aid according to claim 7, wherein the spring has a spring constant of at most $10^5$ N/m.

9. A method for supporting a person with an orthopedic standing and walking aid, comprising:

providing the orthopedic standing and walking aid according to claim 1; and arranging the orthopedic standing and walking aid or adjusting a height of the saddle whereby the person sitting thereon touches the floor located under the orthopedic standing and walking aid with his/her feet, so that a first part of the body weight of this person is carried by the orthopedic standing and walking aid and a second part of the body weight is transferred to the floor.

10. The method according to claim 9, comprising using an electronic control device integrated into the orthopedic standing and walking aid to stimulate the person's leg muscles using electrical signals.

11. The orthopedic standing and walking aid according to claim 1, wherein the spring is arranged between the suspension device and the C-shaped frame or between the saddle and the C-shaped frame so that the saddle is elastically supported in the vertical direction.

12. A vertical access aid, comprising:

a roughly C-shaped frame suspended from a suspension device including a spring so that the C-shaped frame is elastically supported in a vertical direction, a saddle which is arranged on the C-shaped frame approximately in rectilinear alignment below the suspension device, with a saddle post extending from the saddle into a sleeve connected to the C-shaped frame, wherein the saddle post is slidably mounted in the sleeve, a height-adjusting spring arranged below the saddle post, which exerts an upward preload on the saddle and allows for adjusting a height of the saddle, and a lock with which the height-adjusting spring is lockable, wherein the saddle has an elongated slim shape whereby a person sitting on the saddle arranges his/her legs directed downwards on opposite lateral sides of the saddle to be in a standing position while seated, wherein the C-shaped frame does not include a backrest or an abdominal support, and the C-shaped frame is shaped so that a person's body does not touch the C-shaped frame when the person is sitting on the saddle, and wherein a body weight of the person sitting on the saddle is transferred from the orthopedic standing and walking aid upwards to the suspension device and no part of the orthopedic standing and walking aid touches a floor located under the orthopedic standing and walking aid, and wherein the person sitting on the saddle is able to walk around freely in all directions while seated.

13. An orthopedic standing and walking aid, comprising:

a carriage which is displaceably mounted on a running rail in a longitudinal direction of the running rail, wherein the running rail is mounted on a further rail arrangement so as to be displaceable transverse to the longitudinal direction of the running rail, and wherein the carriage moves in a horizontal plane below the running rail and the further rail arrangement, an approximately C-shaped frame suspended on the carriage by a suspension device including a spring so that the C-shaped frame is elastically supported by the running rail in a vertical direction, a saddle which is arranged on the C-shaped frame approximately in rectilinear alignment below the suspension device, with a saddle post extending from the saddle into a sleeve connected to the C-shaped frame, wherein the saddle post is slidably mounted in the sleeve, and an operating lever connected to the saddle post, wherein the operating lever is swiveled back and forth between a position that fixes the saddle post in the sleeve and a position in which the saddle post is freely movable in the sleeve, a height-adjusting spring arranged below the saddle post, which exerts an upward preload on the saddle and allows for adjusting a height of the saddle, a lock with which the height-adjusting spring is lockable, and optionally including any of the following group fastened to the C-shaped frame: an eye that secures the person with a safety belt, a hand bow, a headrest, a leg support, a footrest, and a holding device;

wherein the saddle has an elongate slim shape whereby a person sitting on the saddle arranges his/her legs directed downwards on opposite lateral sides of the saddle to be in a standing position while seated, wherein the C-shaped frame does not include a backrest or an abdominal support, and the C-shaped frame is shaped so that a person's body does not touch the C-shaped frame when the person is sitting on the saddle, and wherein a body weight of the person sitting on the saddle is transferred from the orthopedic standing and walking aid upwards to the running rail and no part of the orthopedic standing and walking aid touches a floor located under the orthopedic standing and walking aid, and wherein the person sitting on the saddle is able to walk around freely in all directions while seated.

14. The orthopedic standing and walking aid according to claim 13, wherein the operating lever is positioned below the saddle between the legs of the person sitting on the saddle.

* * * * *